3,097,247
ALKALI METAL DISPERSIONS, THEIR PREPARATION AND USE AS CATALYSTS IN THE LIQUID PHASE POLYMERIZATION OF BUTADIENE
Robert A. Puckett, Phillips, Tex., assignor to Phillips Petroleum Company, a corporation of Delaware
No Drawing. Filed July 5, 1955, Ser. No. 520,101
16 Claims. (Cl. 260—680)

This invention relates to improved alkali metal dispersions and to a method for preparing same.

Dispersions of alkali metals, particularly sodium, have been known and used for many years. Such dispersions are used as catalyst for many organic reactions, e.g., the production of liquid polybutadiene, metalation reactions, refining of hydrocarbon fractions, etc. Several methods are disclosed in the art of the batchwise preparation of sodium dispersions. These batchwise methods work well enough when the sodium dispersion is employed in small scale batch reactions and is used immediately after preparation, however, the sodium dispersions of the prior art are dangerous to handle and it is desirable to have on hand at any given time only very limited quantities of sodium in the dispersed state. It is extremely difficult to pump and to meter such sodium dispersions. With the development of large scale processes, and particularly continuous processes, wherein alkali metal dispersions are employed, it has become highly desirable to be able to prepare these dispersions in a continuous manner.

Alkali metal dispersions, and particularly sodium dispersions, are utilized as catalysts in the production of liquid polybutadiene. As an example of one process for the preparation of liquid polybutadiene, 1,3-butadiene is contacted with an alkali metal catalyst, suspended in a suitable vehicle, under carefully controlled reaction conditions, particularly temperature, catalyst condition and concentration, quantity of solvent, and rate of butadiene addition. The product is recovered by destroying the catalyst by some appropriate means and removing the destroyed catalyst and other solid impurities after which the product is separated from the catalyst vehicle and/or diluent by appropriate means, such as distillation.

The alkali metal is usually added to the polymerization reaction suspended in a vehicle such as xylene. The butadiene monomer is usually added with a suitable solvent such as normal heptane or other substantially saturated hydrocarbon. An initial charge of butadiene is added to the reactor together with the solvent and suspension of alkali metal at the reaction temperature which can be from 60 to 110° C. and the entire mixture is agitated until initial reaction takes place, as evidenced by temperature rise and pressure drop. Butadiene feed is then continued at a rate sufficient to maintain the reaction temperature at the constant desired level, employing cooling to aid in effecting temperature control, when desired. Upon terminating feed of butadiene to the reactor, additional time, such as about 10 minutes, is allowed for completion of the reaction. Effluent from the reactor comprises a mixture, e.g., butadiene solvent, polymer product, unreacted monomer, free metallic catalyst, catalyst vehicle, and the like. It is preferred to decant the polymer-containing effluent so as to separate same from free metal catalyst, and to flash same so as to remove any remaining unreacted monomer. The resulting solution is then subjected to purification, so as to remove alkali metal impurities therefrom. This can be done by adding, e.g., a low molecular weight alcohol, such as methanol, so as to destroy any remaining free metal catalyst. The resulting solution is then washed with dilute acid, or water, or both, so as to remove alkali metal and other water-soluble impurities from the polymer. It is usually advantageous to add an emulsion breaking agent to the washing step so as to avoid the forming of an emulsion of the water and polymer. The polymer, from which the catalyst and water soluble impurities have been removed, is then further purified by appropriate means such as distillation. A preferred method for preparing liquid polybutadiene is more fully described in U.S. Patent No. 2,631,175, issued 1953 to Willie W. Crouch.

In the process for the manufacture of polybutadiene, as hereinabove described, as well as other processes wherein an alkali metal dispersion is utilized as catalyst, the handling of the alkali metal dispersion presents an ever present fire hazard so that an entire operation, wherein hydrocarbons are employed, is maintained in jeopardy as a result of the pyrophoric nature of the sodium dispersion.

It is, therefore, an object of this invention to provide a stable alkali metal dispersion which is not pyrophoric under normal atmospheric conditions.

It is also an object of this invention to provide a method for preparing and using a stable alkali metal dispersion which has sufficient fluidity for convenient handling and which is not pyrophoric under the conditions of its intended use.

It is still another object of this invention to provide an alkali metal dispersion in polybutadiene which is fluid under the conditions of its intended use.

Other and further objects and advantages will be apparent to one skilled in the art upon studying this disclosure of the invention.

Broadly speaking, the invention contemplates the preparation of a dispersion of alkali metal in liquid polybutadiene containing a sufficient amount of a substantially inert diluent to provide the desired fluidity in the dispersion. The diluent can be used in any desired proportions required to provide the desired fluidity in the dispersion. The diluent utilized in the practice of the invention can be a hydrocarbon or hydrocarbon derivative boiling in the range of about 170 to 400° F. The preferred hydrocarbons include aromatic, alicyclic and aliphatic hydrocarbons. Thus the preferred diluent materials include aromatics such as xylene, toluene and benzene; paraffins such as normal heptane, isoheptane, normal octane, isooctanes, nonane, decane and undecane; naphthenes such as methylcyclohexane, dimethylcyclohexanes, and propylcyclohexanes; and ethers such as 1,3-dioxane and 1,4-dioxane. For other purposes wherein high pressures are not inherently used, such as the polymerization of butadiene to produce liquid polybutadiene, the higher boiling diluents are preferred so as to exhibit a lower vapor pressure at the temperature utilized in preparing the dispersions. In those processes wherein alkali metal dispersions are utilized at superatmospheric pressure, and therefore, wherein pressure equipment is inherently used, either the higher boiling or lower boiling diluents can be utilized.

Hydrocarbons containing an olefinic or acetylenic carbon to carbon linkage can be present when the dispersion is prepared provided conditions are such that there will be substantially no polymerization of these diluent materials.

In the polymerization of butadiene to produce liquid polybutadiene the choice of diluent used in the dispersion will be reflected in the finished liquid polybutadiene. Thus, when sodium dispersed in liquid polybutadiene and an aromatic, such as xylene, is used the liquid polybutadiene produced is modified in that the viscosity is lowered and when sodium dispersed in liquid polybutadiene and 1,4-dioxane is used the liquid polybutadiene produced is lighter in color. Alicyclic and aliphatic hydrocarbons, however, when used as diluent in the sodium dispersion have no modifying effect upon the liquid polybutadiene produced.

The polybutadiene used in the catalyst vehicle of the invention will preferably be in the viscosity range of from 1000 to 3000 SFS (Saybolt Furol seconds) at 100° F. Polybutadiene outside this viscosity range can be utilized by proper adjustment of the ratio of polybutadiene and diluent so as to maintain proper fluidity of the dispersion. Liquid polybutadiene having a viscosity of at least 500 SFS at 100° F. can be used in preparing the dispersions of this invention.

The concentration of alkali metal in the vehicle will depend upon the intended use of the catalyst dispersion. For the preparation of liquid polybutadiene a concentration of about 25 weight percent of alkali metal in vehicle is preferred. The concentration can be as low as 15 weight percent and can be as high as 50 weight percent if desired.

The temperature at which the dispersion is formed will be above the melting point of the alkali metal because the procedure involves dispersion of molten alkali metal in the liquid vehicle. It has been found that finely divided alkali metal appears to induce a further polymerization of polybutadiene at a temperature of about 300° F. and above, and that such polymerization reaction is difficult to control, when started, because of the poor heat transfer characteristics of the polybutadiene which results in local overheating and thermal polymerization. Thus, all of the alkali metals except lithium can be dispersed in the molten state at a temperature below 300° F. and, therefore, can be dispersed directly in the liquid mixture of polybutadiene and diluent. Lithium, which melts at about 367° F., is dispersed in the diluent at a temperature above 367° F. and the dispersion is cooled to a temperature below 300° F. and the liquid polybutadiene is then mixed with the dispersion.

Dispersions of sodium and other alkali metals in a mixture of polybutadiene and diluent can be handled safely in the presence of air while hot, whereas, dispersions of alkali metal in lower boiling hydrocarbons such as xylene or heptane almost invariably ignite on exposure to air when hot and have frequently ignited when cold. Dispersions prepared according to the method of this invention are quite stable because of the small density difference between the alkali metal and polybutadiene and such dispersions are particularly desirable in large scale batch operation and also in continuous operation processes because no special precautions are necessary to maintain the alkali metal in the dispersed state in the event of an emergency shut down of the process. The dispersions of this invention being both substantially stable and substantially free from fire hazard can be packaged and transported satisfactorily.

The alkali metal dispersions of this invention can be prepared by agitating the alkali metal and the desired amount of vehicle at a temperature above the melting point of the alkali metal, but below 300° F., until the desired particle size is obtained. When lithium is to be used, it is preferably dispersed in the diluent at a temperateru above 367° F. and then added to the polybutadiene at a temperature below 300° F. A preferred method for preparing the dispersions of this invention is to disperse the alkali metal in the vehicle in apparatus described in copending application Serial No. 478,618, U.S. Patent No. 2,918,435, filed December 30, 1954, by Paul F. Warner. This apparatus comprises alkali metal melt tanks and a dispersing chamber positioned in an oil bath with means for admitting melted alkali metal to the dispersing chamber containing the suspending vehicle. The dispersing chamber contains a motor driven gear pump adapted to circulate the contents of the dispersing chamber through the gear pump and through a nozzle against a target plate so as to continually break up and disperse the globules of molten alkali metal being mixed with the suspending vehicle. Dispersions of alkali metal of carefully controlled particle size can be produced with this device. Sodium dispersions having a sodium concentration up to at least 50 weight percent, and an average particle size of 5 to 10 microns can be prepared continuously and regularly without difficulty by utilizing this device. A residence time of about 30 minutes is usually sufficient to produce a sodium dispersion having an average particle size of 5 to 10 microns. Sodium dispersions having an average particle size of 1 micron have been produced using this device and the vehicle of this invention.

The following examples further illustrate the invention but should not be construed as limiting the invention.

EXAMPLE I

The device and method of copending application Serial Number 478,618, filed December 30, 1954, by Paul F. Warner were used in preparing a dispersion of sodium in a mixture of liquid polybutadiene and xylene. The rates of sodium and dispersing medium addition were controlled so as to provide a residence time of about one hour. The temperature of the oil bath was maintained at about 220° F. The sodium concentration was maintained at about 25 weight percent of the total dispersion. The ratio of polybutadiene to xylene was varied from 75 weight percent polybutadiene and 25 weight percent xylene to 10 weight percent polybutadiene and 90 weight percent xylene. The run was lined out and operated with a ratio of 60 weight percent polybutadiene and 40 weight percent xylene. The polybutadiene used in preparing the dispersion had a viscosity of about 1000 SFS at 100° F. and a specific gravity at 60° F. of about 0.91.

EXAMPLE II

A sodium dispersion was prepared according to the method of Example I having the following composition:

Table I

| | Weight percent |
|---|---|
| Liquid polybutadiene | 67.5 |
| Normal heptane | 7.5 |
| Sodium | 25.0 |
| | 100.0 |

This dispersion was stable, poured easily at room temperature, and could be poured into water without igniting. The dispersion had a particle size of 5 microns and less.

EXAMPLE III

A sodium dispersion was prepared according to the method of Example II wherein the dispersion medium was 90 weight percent liquid polybutadiene and 10 weight percent normal heptane. Operating conditions of the dispersion unit for this run are shown in Table II.

Table II

| | |
|---|---|
| Oil bath temperature, °F | 240 |
| Sodium feed rate, lbs./hr. | 1.40 |
| Dispersing medium: | |
| Polybutadiene, 90 weight percent, lbs./hr. | 3.20 |
| Normal heptane, 10 weight percent, lbs./hr. | |
| Average residence time in disperser, hrs | 1.23 |
| Sodium content of dispersion (calc.), weight percent | 24.60 |

The average particle size of the sodium was 1 to 2 microns with the largest particles being 5 microns.

Runs were made wherein the dispersion media compositions were as shown in Table III.

Table III

| | Liquid Polybutadiene, weight percent | Normal Heptane, weight percent |
|---|---|---|
| 1 | 85 | 15 |
| 2 | 50 | 50 |
| 3 | 15 | 85 |

EXAMPLE IV

A sodium dispersion was prepared according to the procedure of Example III except that an isoparaffinic hydrocarbon fraction boiling in the range of 350 to 400° F. was used instead of normal heptane in a dispersion medium containing 15 weight percent liquid polybutadiene and 85 weight percent of isoparaffinic hydrocarbon. The conditions were the same as in Table II with this exception. The dispersion was stable and poured at room temperature.

Reasonable variations and modifications are possible within the scope of the disclosure of the invention, the essence of which is the provision of a stable and non-pyrophoric dispersion of an alkali metal which is prepared by dispersing the alkali metal in a mixture of liquid polybutadiene and a hydrocarbon boiling in the range 200 to 400° F.

That which is claimed is:

1. The process which comprises preparing a catalytic dispersion of an alkali metal by intimately mixing 15 to about 25 weight percent of a finely divided alkali metal in a liquid consisting essentially of from 15 to 90 weight percent of liquid polybutadiene and from 85 to 10 weight percent of a liquid hydrocarbon selected from the group consisting of aromatic, alicyclic, and aliphatic hydrocarbons boiling in the range about 170 to 400° F. and using the resulting dispersion as the catalyst in the liquid phase polymerization of butadiene to produce polybutadiene.

2. The process of claim 1 wherein the alkali metal is sodium.

3. The process of claim 2 wherein the liquid diluent is xylene.

4. The process of claim 2 wherein the liquid diluent is normal heptane.

5. The process of claim 2 wherein the liqiud diluent is an isoparaffinic hydrocarbon fraction boiling in the range 350 to 400° F.

6. The proces of claim 1 wherein the liquid diluent is normal octane.

7. The proces of claim 1 wherein the liquid diluent is methylcyclohexane.

8. The process of preparing a dispersion containing about 25 weight percent of an alkali metal useful as the catalyst in the liquid phase polymerization of butadiene to produce polybutadiene and wherein the alkali metal has a melting point below 300° F. which comprises melting the metal at a temperature below 300° F.; intimately mixing the molten alkali metal and a mixture of liquid polybutadiene and a liquid hydrocarbon selected from the group consisting of aromatic, alicyclic, and aliphatic hydrocarbons boiling in the range about 170 to 400° F. containing from 15 to 90 weight percent polybutadiene at a temperature in the range 215 to 250° F. and a pressure sufficient to maintain the hydrocarbons in the liquid phase for a time sufficient to reduce the particle size of the alkali metal to about 1 to about 10 microns.

9. A fluid, non-pyrophoric composition useful as the catalyst in the liquid phase polymerization of butadiene to produce polybutadiene consisting essentially of 15 to about 25 weight percent of a finely divided alkali metal having a particle size in the range of about 1 to about 10 microns suspended in a liquid consisting essentially of 15 to 90 weight percent of liquid polybutadiene and from 85 to 10 weight percent of a liquid hydrocarbon selected from the group consisting of aromatic, alicyclic, and aliphatic hydrocarbons boiling in the range about 170 to 400° F.

10. The composition of claim 9 wherein the alkali metal is sodium.

11. The composition of claim 10 wherein the liquid diluent is xylene.

12. The composition of claim 10 wherein the diluent is normal heptane.

13. The composition of claim 10 wherein the diluent is an isoparaffinic hydrocarbon fraction boiling in the range 350 to 400° F.

14. The composition of claim 9 wherein the diluent is normal octane.

15. The composition of claim 9 wherein the diluent is methylcyclohexane.

16. The proces of preparing a stable, fluid, non-pyrophoric dispersion of lithium useful as the catalyst in the liquid phase polymerization of butadiene to produce polybutadiene which comprises melting lithium; intimately admixing the molten lithium and a liquid hydrocarbon diluent selected from the group consisting of aromatic, alicyclic, and aliphatic hydrocarbons boiling in the range of about 170° F. to about 400° F. at a temperature of about 367° F. and a pressure sufficient to maintain the hydrocarbon in the liquid phase for a time sufficient to reduce the particle size of the lithium to about 1 to about 10 microns; cooling the resulting dispersion to a temperature below 300° F.; and admixing liquid polybutadiene with the dispersion in an amount sufficient to produce a dispersion containing about 15 to about 25 weight percent lithium dispersed in a mixture of about 15 to about 90 weight percent polybutadiene and about 10 to about 85 weight percent liquid hydrocarbon diluent.

References Cited in the file of this patent

UNITED STATES PATENTS

| 2,483,886 | Crouch | Oct. 4, 1949 |
| 2,483,887 | Crouch | Oct. 4, 1949 |
| 2,495,137 | Rowland | Jan. 17, 1950 |
| 2,642,345 | Bradley et al. | June 16, 1953 |